April 16, 1968     S. JEFFEE     3,377,914

METHODS AND APPARATUS FOR AUTOMATIC OPTICAL REDUCTION

Filed March 29, 1965     5 Sheets-Sheet 1

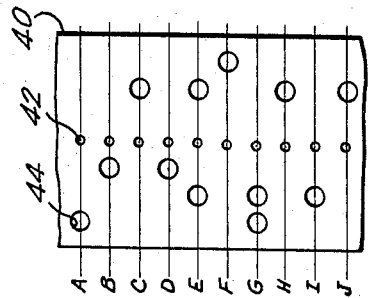
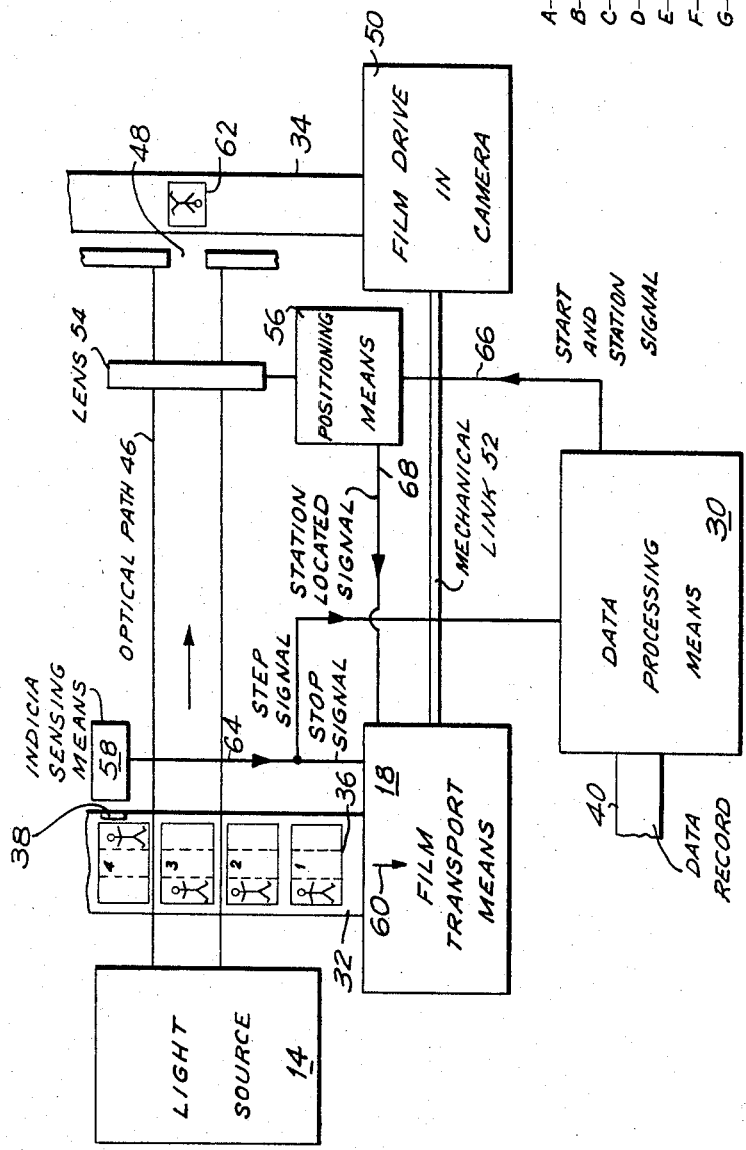

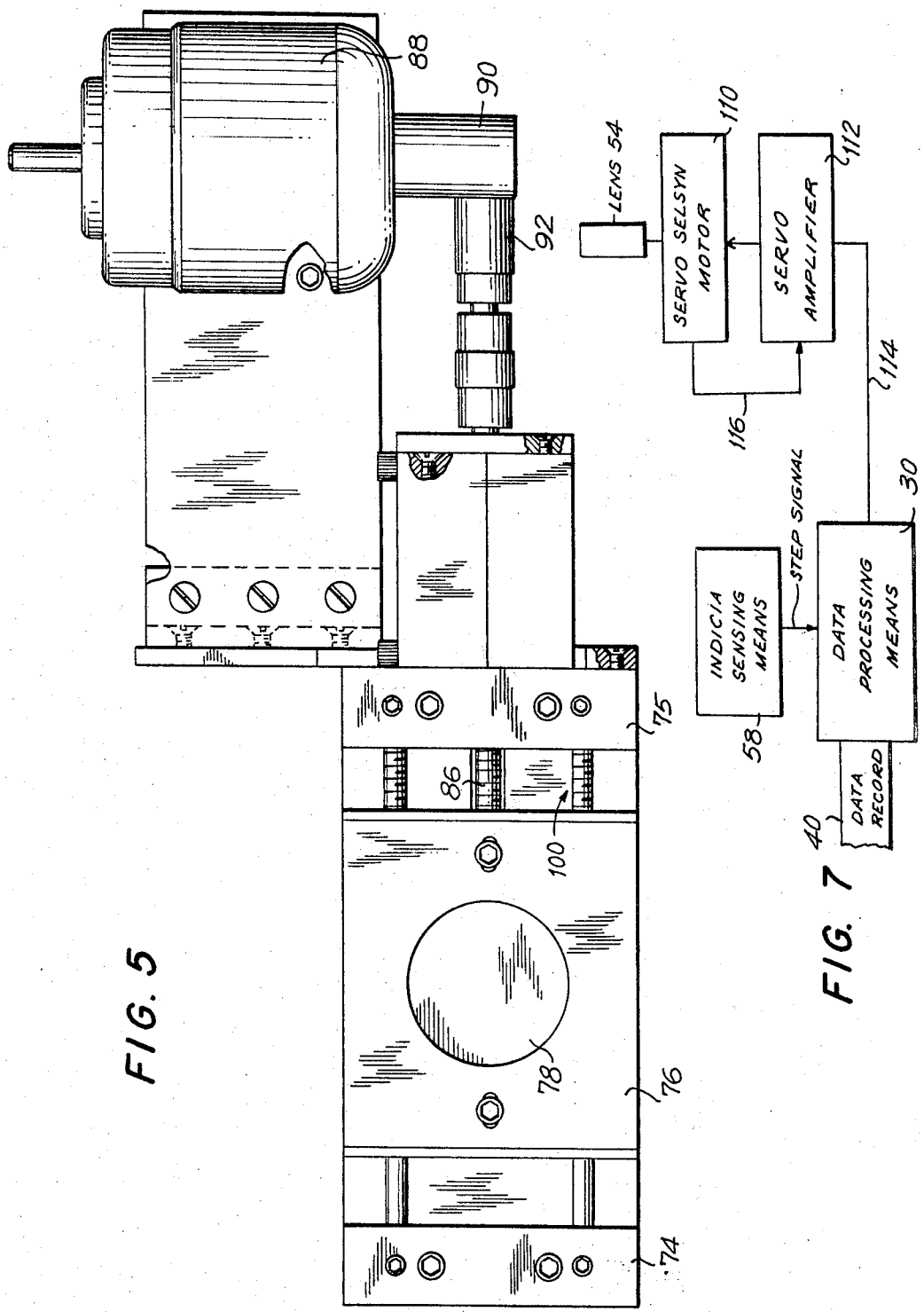

United States Patent Office 3,377,914
Patented Apr. 16, 1968

3,377,914
METHODS AND APPARATUS FOR AUTOMATIC OPTICAL REDUCTION
Saul Jeffee, Scarsdale, N.Y., assignor to Movielab, Inc.
Filed Mar. 29, 1965, Ser. No. 443,404
24 Claims. (Cl. 88—24)

ABSTRACT OF THE DISCLOSURE

A method and apparatus for automatic optical reduction with respect to which a film is divided into sequence by indicia placed thereon and these indicia are employed to control a data record device which controls the movement of a lens by which portions of the frames on the film are transmitted to a negative.

---

This invention relates to methods and devices for automatic optical reduction and more particularly to techniques pertaining, for example, to anamorphic unsqueezing and scanning.

When pictures are photographed for anamorphic systems or the like, the wide field of action is compressed in width by a ratio of approximately 2.35:1.

When this image is unsqueezed, for example, to 16 mm. for television or direct 16 mm. projection, the aperture size is such that about 42% of the width is lost. This loss of width very often cuts into the principal action to such an extent that the continuity of action is lost or appears to have been destroyed. This makes it necessary to re-compose in optical printing the scenes so affected so that the principal portion of action is retained in the 16 mm. negative and story continuity is not lost or destroyed.

It is an object of the invention to provide an improved system and technique to program the aforesaid operation on a printing mechanism.

To achieve the above and other of its objectives, the invention contemplates a method which, for example, comprises two general but related steps.

The first of the steps comprises inspecting a preprint film having arranged thereon a plurality of successive photographic sequences and placing, on the film, indicia indicating transposition points between successive sequences, while also inspecting each of the sequences to determine which of a plurality of zones comprising the width of the film is the zone of principal action in each of the respective sequences (or, in other words, the zone which is to be used after unsqueezing the original image), and recording the results of the inspection on a data recording medium.

The second of the general steps comprises passing the film through a projection and transmitting images from the entire width of the film along an optical path through an anamorphic lens towards an unexposed film which is adapted for recording only a portion of the images received from the first said film. This latter film is passed through the optical path in synchronism with the movement of the first said film, such that a part of the width of the images projected from the first said film is lost.

According to a feature of the invention in the second of the general steps, the projected images are intercepted with a lens (anamorphic for unsqueezing) which is displaceable transversely of the optical path and is positioned between the films, and the first said film is inspected for indicia of the aforesaid transposition points, the film being stopped when a transposition point is detected and the lens being automatically positioned in one of a number of stations transversely of said optical path under the control of the aforesaid data recording medium. It is also possible to have the projected image intercepted with the lens which is shifted transversely while the film is running through the projector head which gives a running panoramic type of recomposition covering the principal action portion of any particular scene.

The arranging of the lens as aforesaid provides for exposing the second said film solely to the zones of principal action in the sequences on the first said film.

A particular embodiment of the invention as regards the apparatus provided thereby, proposes the use of a light source adapted for projecting a beam of light along an optical path, there being also provided a source of unexposed pre-print film having thereon a plurality of frames constituting successive photographic sequences. Indicia are provided on this film to indicate the transposition from one sequence to another and film take-up means is provided to receive the film.

Said apparatus further contemplates the use of film transport means to transport the film from the aforesaid source to the take-up means and in intersecting relation with the optical path whereby images on the pre-print film are projected along the optical path.

According to the invention, camera means is operatively disposed to receive images projected along the optical path and to expose, to said images, film adapted on exposure to record portions of the images in frames having a field width less than that of the aforesaid frames.

According to another feature of the invention, means is provided to synchronize the operation of the transport and camera means, whereby the films are moved in synchronism with each other, there being also provided means to inspect the indicia on the first said film in order to halt the films upon transposition from one sequence to another at the optical path.

The invention, moreover, contemplates lens means located between the films, with positioning means being provided to displace the lens means transversely of the optical path through a plurality of positions whereby the the film in the camera means is exposed to respective zones of the field of the pre-print film or to move the lens to another position to effect a running pan if desired.

Data storage means, having data thereon corresponding to the successive sequences and indicating for these sequences the respective zones of principal action or direct of panning, is employed along with means to inspect the same and to control in accordance with said data the aforesaid positioning means to pan or to move the lens means to a position whereat the film in the camera means is exposed to the zone of principal action for each sequence on the pre-print film.

The above and other objects and features as well as advantages of the invention will become apparent from the following detailed description of a preferred embodiment thereof, as illustrated in the accompanying drawing, in which:

FIGURE 3 is a diagrammatic view illustrating the apparatus of the invention;

FIGURE 4 illustrates a data record medium employed in accordance with the invention;

FIGURE 5 is a top plan view of a lens positioning means provided in accordance with the invention;

FIGURE 7 diagrammatically illustrates a further embodiment of the invention relating to a running pan.

In accordance with the general provisions of one embodiment of the invention, there is provided an optical printer equipped with a servo system to shift an objective lens comprised by the printer from side to side to any one of a plurality of positions located center and left and right of center.

After a careful study of a large number of anamorphic pictures, it has been found that seven portions of the usual frame are sufficient to retain good composition of the frame, it being also appreciated that an infinite number of left and right positions can be used if deemed desirable.

Each reel of the subject pre-print film is projected or viewed on machines that have the seven positions outlined and the segment of each picture or frame that is desired is determined for each scene and a control strip or tape is punched for use in subsequently actuating the printer lens positioning mechanism when this particular scene or sequence is being printed.

As will be shown, the control strip or tape advances one step for each scene or sequence and the machine stops at the scene change and selects the position to which the lens will have to move for recomposition of the picture for the next sequence. When the lens reaches the new position, the machine automatically continues. In the case of a running panoramic type of recomposition, the servo motor starts to shift the lens in the direction desired and does not stop until a second signal is received to stop it or to reverse its direction if so desired.

In FIGS. 1a–1g are illustrated a plurality of frame relationships, the frame 10 having a width W1 constituting the field width of the anamorphic film or the pre-print film from which the reproduction is to be made and the frame 12, having a field width W2 constituting the width of the frame which is to be printed. In these figures, the hatched portion indicates the portion of the original frame which is cropped or lost.

As will be seen in FIGS. 1a–1g, according to a preferred embodiment of the invention, frame 12 can be selected to be located in any one of seven positions including a center position and three positions on the left and right thereof. Alternatively, a running shift left or right can be provided to keep the principal action located in that area of the frame which is being printed in the camera.

The lost portion of the width constitutes about 42% thereof and the seven positions or stations divide this into 6% for each position.

It is the purpose of the invention to provide for locating the zone of principal action for each scene within the frame 12 which is to be printed from the original pre-print film.

Figure 1A:
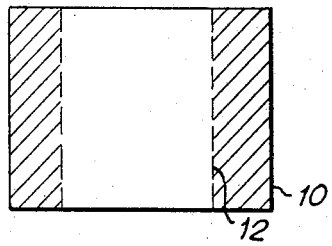
FIGURES 1a–1g illustrate the frame relationship dealt with in accordance with the invention.
Figure 1B:
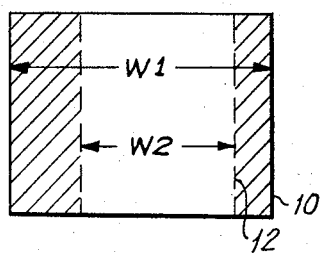
Figure 1C:
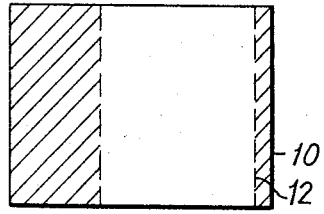
Figure 1D:
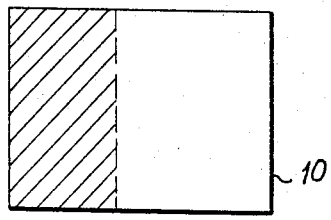
Figure 1E:
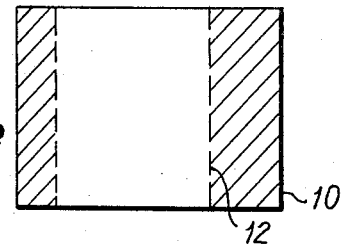
Figure 1F:
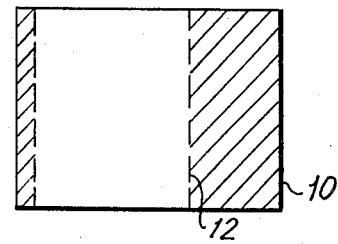
Figure 1G:
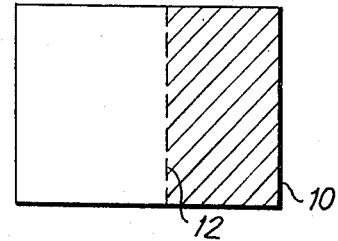
Figure 2:
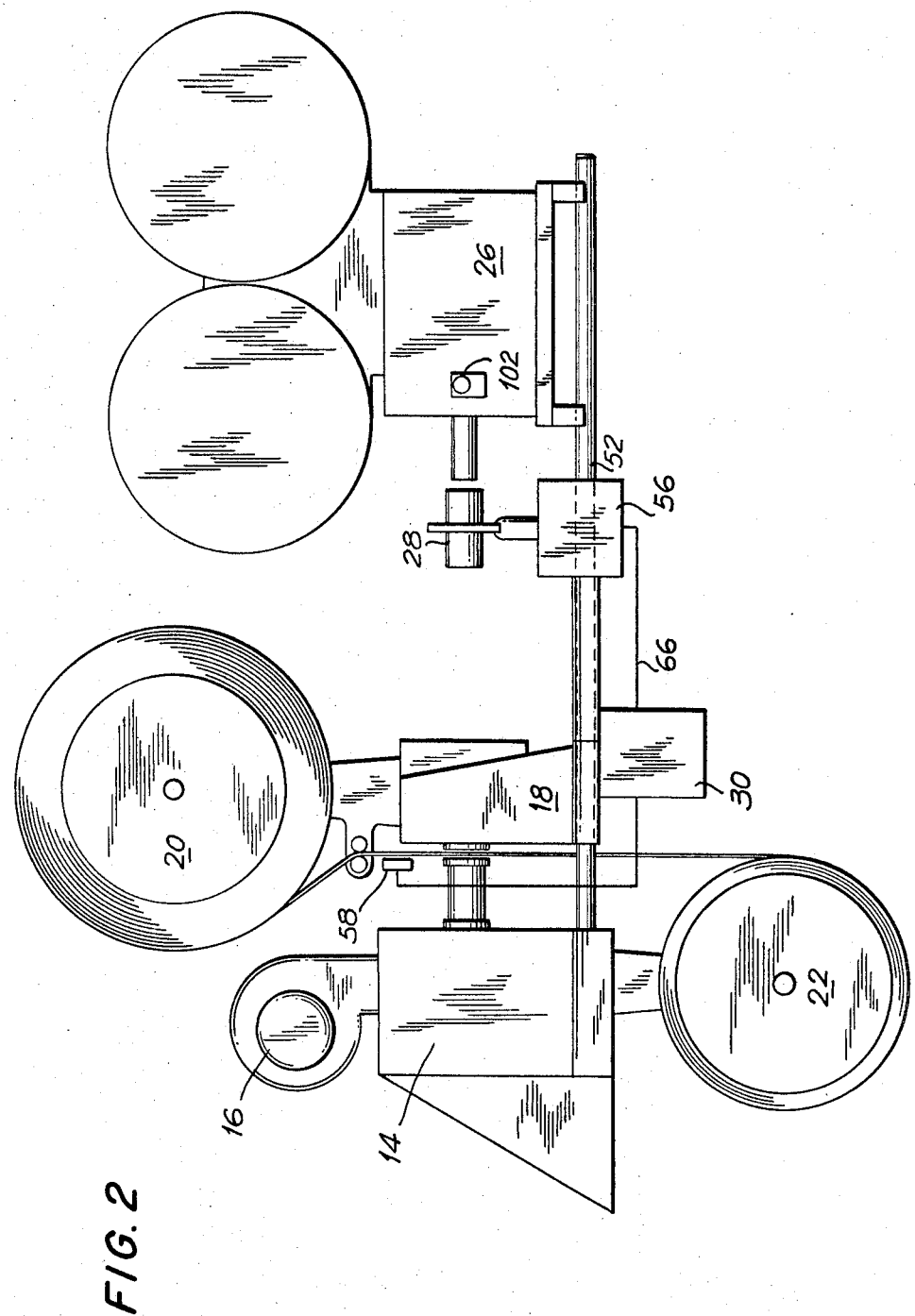
FIGURE 2 is a partially diagrammatic, partially pictorial view of the apparatus contemplated by the invention.

The apparatus illustrated in FIG. 2 is suitable for achieving the purposes of the invention and for practicing the methods thereof.

This apparatus consists generally of a light source 14 having a conventional blower 16 and with which is operatively associated a film projection head including a film transport mechanism 18 on one side of which is provided a film source 20 and on the other side of which is provided a film take-up mechanism 22.

At one end of the optical path established by the light source 14 and film transport device 18 is operatively disposed a camera 26 which is adapted to receive images transported along the optical path and expose a film to the same.

According to the invention there is interposed between the film transport mechanism 18 and the camera 26 a lens means 28 which has the purpose, as indicated above, of locating a lens at various stations transversely of the optical path for purposes of selecting the zones of principal action.

Also contemplated within the scope of the invention is the use of the data processor 30, some of the details of which will become apparent hereinafter.

The principles of the invention are more apparent from FIG. 3, wherein is shown a pre-print film 32, the contents of which are to be unsqueezed and printed on a second film 34 which may be referred to hereinafter as the unexposed film.

On the pre-print film 32 are arranged a series of frames 36, said frames having a field width which exceeds the field width of the frames which will appear on the film 34 and the width of the frames 36 will hereinafter be considered as constituting the effective width of the film 32.

As is usual in motion picture photography, the frames will constitute a plurality of successive photographic sequences. For example, in FIG. 3, frames 1, 2 and 3 constitute the end of one sequence and frame 4 constitutes the beginning of the next successive sequence. This is manifested by placing the figure to the left in frames 1, 2 and 3 and to the right in frame 4.

It is apparent that if the central portions of the frames 36 are the portions transmitted to the film 34, the zones of principal action will be omitted from the photographic record made on film 34 and the important subject matter of the film 32 will be lost. Accordingly, one of the objects of the invention is to assure that the zones of principal action are reproduced on film 34.

To this end the film 32 is pre-inspected and an indicia, such as indicia 38, is placed on the film to indicate a transposition point whereat the sequences terminate and the next successive sequence begins. Such indicia need not be positioned directly at the point of transposition, but should have a fixed relationship to the corresponding point of transposition for purposes of stopping the motion of the film or for starting the transverse movement of the lens, as will be hereinafter indicated in greater detail.

As the film is inspected for the aforesaid transposition points, the various sequences are also studied to indicate these zones of principal action therein. Since, as has been noted above, in accordance with a preferred embodiment of the invention, seven such zones will generally be sufficient to cover all of the action in a film, this limited number of zones may be recorded or noted on a record medium such as is shown, for example, in FIG. 4, wherein is shown a punched paper tape 40.

On the punched paper tape 40 are shown a plurality of sprocket holes 42, by means of which the tape is driven or stepped along. Each sprocket hole, may for example, represent a tape zone in which can be recorded information indicating which of the zones on the film 32 is the zone of principal action for the related sequence. A plurality of such zones, A–J, are illustrated in FIG. 4 and each of such zones represents a corresponding sequence on the film 32, the holes 44 being positioned in such zones on the tape 40 as to identify the zone of action for the corresponding sequence.

It will be appreciated that various other types of storage media are known, such as, for example, magnetic tapes, magnetic drums, electrostatic media, photoelectric media and so forth and that all of these types of media can be employed within the scope of the instant invention.

Referring again to FIG. 3, it is seen that the light projector 14 projects a beam of light along the optical path 46, the film 32 being transported from the source 20 to the take-up mechanism 22 by the film transport means 18, as a result of which the film 32 moves in intersecting relationship with the optical path 46 and images of the frames 36 are transmitted along said path 46.

At the other end of the optical path 46 is arranged the film 34, as aforesaid, said film being displaced past the aperture 48 provided, as is conventional in a light impermeable screen or body, by the film drive 50 provided in the camera 26, the use of which has been indicated above.

In accordance with the invention, the film transport means and the film drive 50 are driven in synchronism. This can be provided through the use of any conventional mechanical link 52, the details of which will be apparent to those skilled in the art. Both said driving means can themselves be driven by an electrical motor or the like.

Arranged in intersecting relationship with the optical path 46 is the lens 54 in turn mounted on the lens positioning means 56 for purposes of being moved transversely of the path 46.

According to a further feature of the invention, there is provided an indicia sensing means 58 operatively disposed relative to the film 32 and adapted to detect the presence of indicia 38 on said film.

Finally, there is coupled to the aforesaid positioning means 56 and the indicia sensing means 58 the data processing means 30 in which are inspected the data recorded on the data record medium 40, details of which have been previously indicated.

In operation, with the light source 14 operative, the film transport means 18 is actuated to displace the film 32 in the direction of the arrow 60 and in intersecting relationship through the optical path 46.

While the apparatus is so operative, images of the frames 36 will be transmitted along the optical path 46 through the lens 54 and through the aperture 48 to the film 34, whereat will be produced frames 62 which are of lesser field width than the frames 36.

The aforesaid operation will be continuous until the termination of a particular sequence (e.g., frames 1, 2 and 3), at which time an indicia 38 will be indicated by the sensing means 48 and a signal will be sent via line 64 to the film transport means 18 and to the data processing means 30.

This signal will operate in conventional manner to halt the film transport means 18 precisely at the scene change with the shutter closed so as to stop the motion of the film 32. This stoppage will permit an adjustment of the lens 54, as is next described hereinafter.

The signal proceeding via line 64 to the data processing means 30 will operate to step the data record 40 by a single increment, thus moving to data sensing and detecting means of conventional nature within the means 30, the indication of the zone of principal action for the next successive sequence (e.g., that sequence starting with frame 4 on film 32).

The data processing means 30 will transmit this information via line 66 to the positioning means 56 which will be actuated by this signal in conventional manner to initiate movement of the lens 54 which will thus hunt out the position indicated by the start and station signal received from the line 66.

When the lens 54 reaches the appropriately indicated position or station, this will be detected in conventional manner by positioning means 56 and a station-located signal will be transmitted via line 68 to the film transport means.

Film transport means 18 will respond to the signal received via line 68 to recommence operation and film 32 will once again be driven in the direction of arrow 60. At the same time, due to mechanical link 52, film drive 50 is actuated and film 34 is again driven in synchronism with the film 32.

As a result of the features indicated hereinabove, it is possible to stop the motion of the film 32 and thus of the film 34 at the termination of each sequence, to provide a hiatus in the printing on the film 34, during which the lens 54 can be appropriately maneuvered to a position or station to compensate for differences in zones of principal action in the different sequences on the film 32. This operation is entirely automatic, with the exception of the preparatory inspection which is made and which is recorded in the form previously discussed relative to FIG. 4.

The particular details of the positioning means 56 may vary within a wide range within the scope of the invention. However, a preferred form of such positioning means is illustrated in FIGS. 5 and 6, in which an electromechanical servo-mechanism is indicated.

Figure 6:
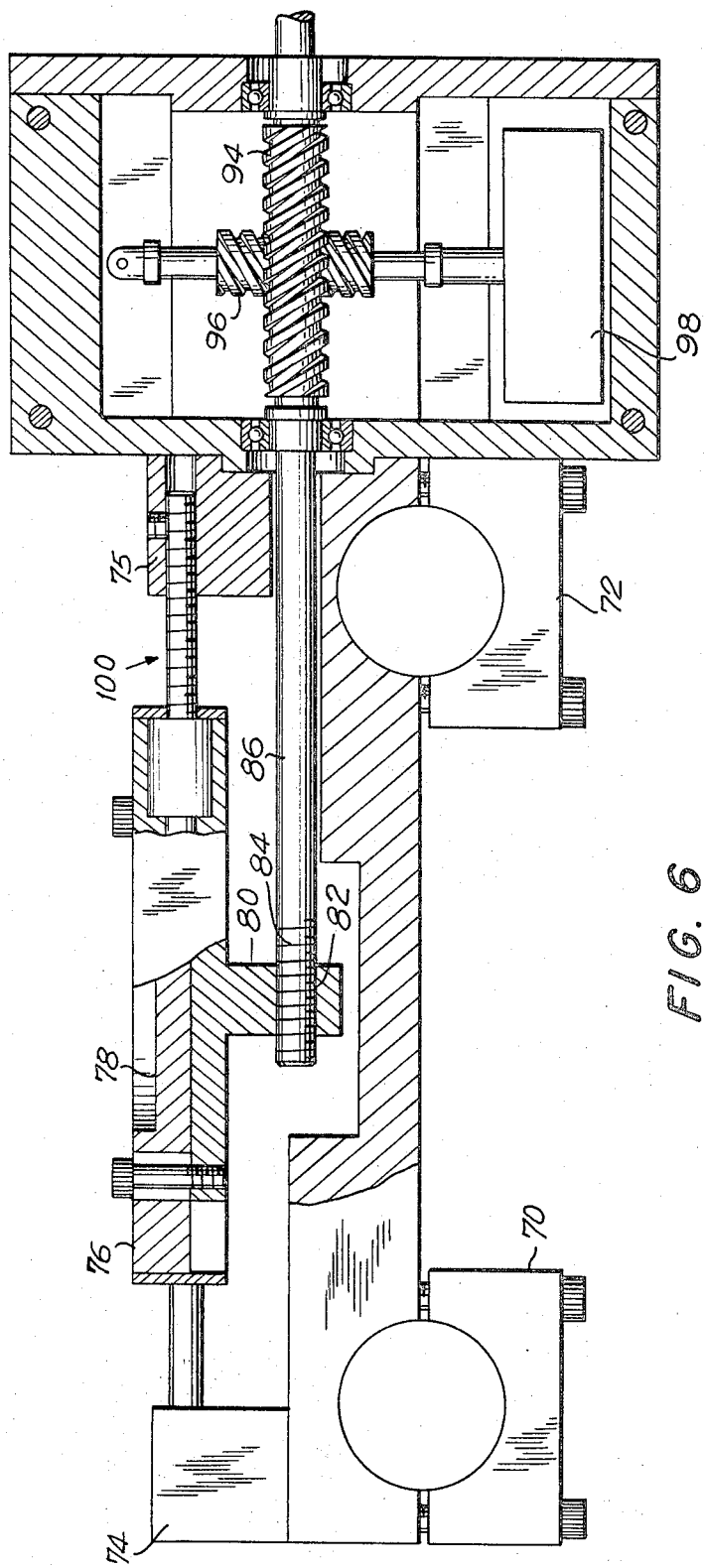
FIGURE 6 is a side view partially in section and partially broken away of the apparatus illustrated in FIG. 5.

In FIGS. 5 and 6 are indicated supports 70 and 72 on which are mounted guides 74 and 75 which establish the path of movement for a table 76 constituting a lens mount, the lens being supported, for example, in a receptacle 78 provided in said table 76.

Underneath said table 76 is provided a lug 80, having therein a threaded opening 82 engaged by the threaded end 84 of an elongated rod 86.

Rod 86 is rotated by an electrical motor 88 which is coupled to the rod 86 by means of gears 90 and 92, constituting a gear train to which the table 76 is driven.

Mounted on the rod 86 is a worm 94 in meshing engagement with a complementary gear section 96, the rotation of which indicates to a positioning control 98 the extent through which the table 76 has been displaced.

In the positioning control 98 may be employed a matrix and contact points of known arrangement, which enable a station-located signal to be generated and employed as aforesaid, the details of this arrangement being obvious to those skilled in the art and not forming a part of this invention.

Finally, there may be provided a position-indicating unit 100, the purpose of which is to visually indicate the position being assumed by the lens mounted on the table 76, said position-indicating unit may take many forms, of which the most simple is illustrated as consising of position inscriptions on the rod supporting the table 76.

The purpose of the lens positioning means has been described above and is more particularly intended to control movement of the lens 28 (FIG. 2) normal to the plane of the drawing.

The results of the movement of lens 28 can be viewed by an operator through the operator viewing means 102 illustrated in FIG. 2.

In accordance with a further embodiment of the invention relating to a running pan, the data record medium can be provided with holes that are interpreted electrically to drive the lens mechanism in selected direction within the full range from left to right.

The apparatus for this is illustrated diagrammatically in FIG. 7, which is a variation of FIG. 3. The same indicia sensing means 58 is employed as in FIG. 3 and it cooperates with data processing means 30 and the data record 40. However, no stop signal is fed to the film transport means 18 (FIG. 3). Instead the apparatus of FIG. 7 includes a servo-mechanism which consists of a servo selsyn motor 110 that receives pulses to rotate either left or right from a servo amplifier 112 that receives command pulses via line 114 for positioning from the record medium.

The servo selsyn motor also transmits a feed back pulse via line 116 to the servoselsyn amplifier when the positioning mechanism has reached the position that the record medium designated.

The feed back information can be provided by a multirotational potentiometer (not shown) driven from the servo selsyn motor or by any similar technique.

The requirement that the optical printer continue to transport film while the lens mechanism is repositioning is accomplished by a separate hole in the record medium which is interpreted electrically and maintains a running clutch (not shown) in an open position. If the hole in the record medium is omitted, the clutch engages on cue and the optical printer stops the film transport with the exposure shutter closed. On completion of the repositioning mechanism, the clutch is engaged and the optical printer begins its operation.

These same operations, for providing a continuous rather than an incremental control, can be accomplished in any other system of an electrical, electro-mechanical, pneumatic or hydraulic nature or the like.

There will now be obvious to those skilled in the art many modifications and variations of the methods and devices set forth above. These modifications and variations will not depart from the scope of the invention if defined by the following claims.

What is claimed is:

1. A method for using a preprint film having thereon a plurality of successive photographic sequences with indicia indicating transposition points between successive sequences and with respect to which each of the sequences has been inspected to determine which of a plurality of zones comprising the width of the film is the zone of principal action in each of the respective sequences and the results of the inspection have been recorded on a data recording medium; said method comprising passing the preprint film through a projector and transmitting images from the entire width of said preprint film along an optical path towards an unexposed film, passing the unexposed film through said optical path in synchronism with the movement of said preprint film and exposing said unexposed film to a limited portion of each of said images, interposing a lens which is displaceable transversely of said path between said preprint film and unexposed film, inspecting the preprint film for indicia of said transposition points and stopping said preprint film and unexposed film when a transposition point is brought to said optical path, and adjusting said lens transversely of said path in accordance with the data on said recording medium in order to expose the unexposed film to the zones of principal action in the images projected from said preprint film.

2. A method comprising inspecting a preprint film having arranged thereon a plurality of successive photographic sequences and marking the preprint film with indicia indicating transposition points between successive sequences having different zones of principal action, and recording identifications of said zones sequentially on a data record medium.

3. A method as claimed in claim 2 wherein said record medium is separate from said film.

4. A method comprising inspecting a preprint film having arranged thereon a plurality of successive photographic sequences and placing on the preprint film indicia indicating transposition points between successive sequences, inspecting each of the sequences to determine which of a plurality of zones comprising the width of the film is the zone of principal action in each of the respective sequences, encoding the results of the inspection on a data recording medium, passing the preprint film through a projector and transmitting images from the entire width of said preprint film along an optical path towards an unexposed film, passing the unexposed film through said optical path in synchronism with the movement of said preprint film and exposing said unexposed film to said images through an opening in a light impermeable element which blocks out a part of the width of the images projected along said optical path, interposing a lens transversely of said path between said preprint film and unexposed film, inspecting the preprint film for indicia of said transposition points and stopping said preprint film and unexposed film when a transposition point is brought to said optical path, and adjusting said lens transversely of said path in accordance with data on said recording medium to expose the unexposed film to the zones of principal action in the images projected from said preprint film.

5. A method as claimed in claim 4 wherein the indicia are notched into the preprint film.

6. A method as claimed in claim 4 wherein the indicia are placed on the film in the form of electrically conductive elements.

7. A method as claimed in claim 4 wherein the indicia are placed on the film in the form of photoelectrically detectable elements.

8. A method comprising marking a preprint film, having arranged thereon a plurality of successive photographic sequences, with indicia indicating transposition points between successive sequences; recording data indicating which of a plurality of zones comprising the effective width of the film is the zone of principal action for each of the respective sequences, on a data recording medium; projecting images from the entire width of said preprint film along an optical path towards an unexposed film passing through said optical path in synchronism with the movement of said preprint film, exposing said unexposed film to portions of the images projected along said optical path, there being provided a lens which is displaceable transversely of said path between said preprint film and unexposed film and through a predetermined number of stations to expose the unexposed film to respective zones of the images projected from said preprint film, inspecting the preprint film for indicia of said transposition points and stopping said preprint film and unexposed film when a transposition point is brought to said optical path, and automatically positioning said lens in one of said stations under the control of said data recording medium.

9. A method comprising inspecting a preprint film having arranged thereon a plurality of successive photographic sequences and placing, on the preprint film, indicia indicating transposition points between successive sequences, inspecting each of the sequences to determine which of a plurality of zones comprising the width of the film is the zone of principal action in each of the respective sequences, encoding the results of the inspection on a data recording medium, passing the preprint film through a projector and transmitting images from the entire width of said preprint film along an optical path towards an unexposed film, passing the unexposed film through said optical path in synchronism with the movement of said preprint film and exposing said unexposed film to said images through an opening in a light impermeable element which blocks out a part of the width of the images projected along said optical path, intercepting said images with a lens which is displaceable transversely of said path between said preprint film and unexposed film, inspecting the preprint film for indicia of said transposition points and stopping said preprint film and unexposed film when a transposition point is brought to said optical path, and automatically positioning said lens transversely of said path under the control of said data recording medium to expose the unexposed film to the zones of principal action in the images projected from said preprint film.

10. Apparatus for using a preprint film having thereon a plurality of frames constituting successive photographic sequences, there being provided indicia on the film to indicate the transposition from one sequence to another, said apparatus comprising a light source adapted for projecting light along an optical path, film transport means to transport the film through said optical path so that images on the film are projected along said path, camera means operatively disposed to receive images projected along said optical path and to expose, to said images, film adapted on exposure to record portions of the images in frames having a field width less than that of the first said frames, means to synchronize the operation of said transport and camera means whereby the films are moved in synchronism with each other, means to inspect said indicia and halt the films upon transposition from one sequence to another at said optical path, anamorphic lens means between the first said film and the camera means, and positioning means to displace said lens means transversely of said path through a plurality of positions whereby the film in the camera means is exposed selectively to different zones of the field of the preprint film.

11. Apparatus comprising a light source adapted for projecting a beam of light along an optical path, a source of preprint film having thereon a plurality of frames constituting successive photographic sequences, indicia on the film to indicate transposition from one sequence to another, film take-up means to receive said film, film transport means to transport the film from the film source to the take-up means in intersecting relation with said optical path whereby images on the film are projected along said path, camera means operatively disposed to receive images projected along said optical path and to expose, to said images, film adapted on exposure to record portions of the images in frames having a field width less than that of the first said frames, means to synchronize the operation of said transport and camera means whereby the films are moved in synchronism with each other, means to inspect said indicia and halt the films upon transposition from one sequence to another at said optical path, lens means between said transport and camera means adjustable through a plurality of positions whereby the film in the camera means is exposed selectively to different zones of the field of the preprint film, and incrementally operable data storage means having data thereon corresponding to said successive sequences and indicating for the same the respective zones of principal action and to control, in accordance with data stored therein, movement of said lens means to a position whereat the film in the camera means is exposed to the zone of principal action for the next sequence on the preprint film.

12. For use with a light source adapted for projecting a beam of light along an optical path, a source of preprint film having thereon a plurality of frames constituting successive photographic sequences, indicia on the film to indicate the transposition from one sequence to another, film take-up means to receive said film, and film transport means to transport the film from the film source to the take-up means in intersecting relation with said optical path whereby images on the film are projected along said path, apparatus comprising camera means operatively disposed relative to said path to receive images projected along the same and to expose, to said images, film adapted on exposure to record portions of the images in frames having a field width less than that of the first said frames, means to synchronize the operation of said transport and camera means whereby the films are moved in synchronism with each other, means to inspect said indicia and halt the films upon transposition from one sequence to another at said optical path, anamorphic lens means in said path, positioning means to displace said lens means transversely of said path through a plurality of positions whereby the film in the camera means is exposed selectively to different zones of the field of the preprint film, data storage means having data thereon corresponding to said successive sequences and indicating for the same the respective zones of principal action, and means to inspect the data storage means incrementally under the control of the means to inspect said indicia and to control, in accordance with data stored therein, said positioning means to move said lens means to one of said positions.

13. Apparatus as claimed in claim 12 wherein said data storage means comprises a punched paper tape.

14. Apparatus as claimed in claim 12 wherein said data storage means comprises a magnetic tape.

15. Apparatus comprising a light source adapted for projecting a beam of light along an optical path, a source of preprint film having thereon a plurality of frames constituting successive photographic sequences, indicia on the film to indicate the transposition from one sequence to another, film take-up means to receive said film, film transport means to transport the film from the film source to the take-up means in intersecting relation with said optical path whereby images on the film are projected along said path, camera means operatively disposed to receive images projected along said optical path and to expose, to said images, film adapted on exposure to record portions of the images in frames having a field width less than that of the first said frames, means to synchronize the operation of said transport and camera means whereby the films are moved in synchronism with each other, means to inspect said indicia and halt the films upon transposition from one sequence to another at said optical path, lens means between said transport means and camera means, positioning means to displace said lens means transversely of said path through a plurality of positions whereby the film in the camera means is exposed selectively to different zones of the field of the preprint film, data storage means having data thereon corresponding to said successive sequences and indicating for the same the respective means of principal action, and means to inspect the data storage means incrementally under the control of said means to inspect indicia and to control, in accordance with data stored therein, said positioning means to move said lens means to a position whereat the film in the camera means is exposed to the zone of principal action for the next sequence on the preprint film.

16. Apparatus as claimed in claim 15 wherein said camera means comprises operator viewing means enabling an operator to view images projected towards the film therein.

17. Apparatus comprising a light source adapted for projecting a beam of light along an optical path, a preprint film having thereon a plurality of frames constituting successive photographic sequences, indicia on the film to indicate the transposition from one sequence to another, film take-up means to receive said film, film transport means to transport the film to the take-up means and in intersecting relation with said optical path whereby images on the film are projected along said path, camera means to receive images projected along said optical path and to expose, to said images, film which is adapted on exposure to record portions of the images in frames having a field width less than that of the first said frames, means to synchronize the operation of said transport and camera means whereby the films are moved in synchronism with each other, means to inspect said indicia and halt the films upon transposition from one sequence to another at said optical path, lens means between said films, positioning means to displace said lens means transversely of said path through a plurality of positions whereby the film in the camera means is exposed selectively to different zones of the field of the preprint film, data storage means separate from the first said film and having sequential data thereon corresponding to said successive sequences and indicating for the same the respective zones of principal action, and means to inspect the data storage means in sequence under the control of the means to inspect said indicia and to control said positioning means to move said lens means to a position whereat the film in the camera means is exposed solely to the zones of principal action on the preprint film.

18. Apparatus as claimed in claim 17, wherein said indicia are constituted by notched peripheral portions on the first said film.

19. Apparatus as claimed in claim 17, wherein said indicia are constituted by electrically conductive elements on the first said film.

20. Apparatus as claimed in claim 17, wherein said indicia are constituted by photoelectrically detectable elements on the first said film.

21. Apparatus as claimed in claim 17, wherein said indicia are constituted by electrostatically detectable elements on the first said film.

22. Apparatus as claimed in claim 17, wherein said positioning means comprises an electric motor, a table, a lens mount on said table, a guide for guiding said table, gear means coupling said table to said motor, and station sensing means to determine when said table has conveyed said lens means to said positions.

23. Apparatus as claimed in claim 22, comprising position indicating means operatively associated with said table.

24. Apparatus as claimed in claim 17, wherein the field width of the second said frame is about 42% less than that of the first said frame.

References Cited
UNITED STATES PATENTS 3,199,404   8/1965   Bragg et al. _____ 88—24

NORTON ANSHER, *Primary Examiner.*

R. A. WINTERCORN, *Assistant Examiner.*